US012472606B2

(12) United States Patent
Hu et al.

(10) Patent No.: US 12,472,606 B2
(45) Date of Patent: Nov. 18, 2025

(54) INSTALLATION TOOL FOR A FIXING PIN AND AN INSTALLATION METHOD

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Yiting Hu, Shanghai (CN); Jiahai Ren, Shanghai (CN); Lingqin Kou, Shanghai (CN); Yuqian Zhou, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 239 days.

(21) Appl. No.: 18/248,430

(22) PCT Filed: Jul. 9, 2021

(86) PCT No.: PCT/CN2021/105546
§ 371 (c)(1),
(2) Date: Apr. 10, 2023

(87) PCT Pub. No.: WO2022/073367
PCT Pub. Date: Apr. 14, 2022

(65) Prior Publication Data

US 2023/0364758 A1 Nov. 16, 2023

(30) Foreign Application Priority Data

Oct. 10, 2020 (CN) ........................ 202011074024.3

(51) Int. Cl.
*B25B 27/02* (2006.01)

(52) U.S. Cl.
CPC .................................. *B25B 27/02* (2013.01)

(58) Field of Classification Search
CPC ............................... B25B 27/00; B25B 27/02
See application file for complete search history.

(56) References Cited

U.S. PATENT DOCUMENTS 541,038 A * 6/1895 Clark ....................... B25C 1/02
81/24
2,286,809 A 6/1942 Hutchison et al.
(Continued)

FOREIGN PATENT DOCUMENTS

CN 102909688 A 2/2013
CN 102990604 A 3/2013
(Continued)

OTHER PUBLICATIONS

International Search Report issued on Aug. 30, 2021, in corresponding International Patent Application No. PCT/CN2021/105546, 6 pages.
(Continued)

*Primary Examiner* — Lee D Wilson
(74) *Attorney, Agent, or Firm* — Maier & Maier, PLLC

(57) ABSTRACT

An installation tool and installation method for fixing pins. In the mounting tool a cavity is provided in a tube body for accommodating a plurality of fixing pins. A first sliding groove and a second sliding groove are provided opposite each other and connected to the cavity. A first opening and a second opening are provided in two ends of the tube body. A pressing pin passes through the sliding grooves and is movably arranged on the tube body. The driving nut is adapted to driving the pressing pin to move towards the second opening.

6 Claims, 6 Drawing Sheets

(56) References Cited

U.S. PATENT DOCUMENTS

| | | | | | |
|---|---|---|---|---|---|
| 2,727,546 | A | | 12/1955 | Crowley | |
| 2,973,527 | A | * | 3/1961 | Maynard | B25C 3/006 227/147 |
| 4,120,438 | A | * | 10/1978 | Litch | B25C 1/02 227/147 |
| 4,476,861 | A | * | 10/1984 | Dimakos | A61B 17/92 606/100 |
| 4,519,536 | A | * | 5/1985 | Steigauf | B25C 1/188 227/147 |
| 5,123,584 | A | * | 6/1992 | Harrison | B25C 3/006 227/147 |
| 5,271,543 | A | * | 12/1993 | Grant | A61B 17/115 227/19 |
| 5,735,854 | A | | 4/1998 | Caron et al. | |
| 6,871,568 | B2 | * | 3/2005 | Chen | B25C 1/02 227/113 |
| 8,601,662 | B1 | * | 12/2013 | Rankin | E21C 35/197 29/270 |
| 10,960,523 | B1 | * | 3/2021 | Connors | B25C 3/008 |
| 2015/0059139 | A1 | * | 3/2015 | Dantas | B25B 31/005 29/252 |

FOREIGN PATENT DOCUMENTS

| | | | |
|---|---|---|---|
| CN | 202964546 | U | 6/2013 |
| CN | 107042485 | A | 8/2017 |
| CN | 206578761 | U | 10/2017 |
| CN | 206795708 | U | 12/2017 |
| CN | 208100252 | U | 11/2018 |
| CN | 111922982 | B | 1/2021 |
| EP | 0800796 | A1 | 10/1997 |

OTHER PUBLICATIONS

Office Action issued on Nov. 20, 2020, in corresponding Chinese Application No. 202011074024.3, 13 pages.

* cited by examiner

INSTALLATION TOOL FOR A FIXING PIN AND AN INSTALLATION METHOD

FIELD

The invention relates to the field of engine assembly, in particular to an installation tool for a fixing pin and an installation method.

BACKGROUND

The high pressure turbine rotor is an important part of an aeroengine, which needs to be dynamically balanced before being installed on the engine as a rotating component. Adding balancing weight is an important step for eliminating rotor unbalance. FIG. 1 is a schematic diagram of the structure of the high pressure turbine rotor. Referring to FIG. 1, a balancing weight 30 is fixed on a flange by a fixing pin 20. As the fixing pin 20 is small in size, being a miniature part, it would be difficult to fix and install manually.

In the assembly method in the prior art, a tweezer is generally used to hold the fixing pin 20, after aligning with a mounting hole (not shown in the figure), the fixing pin 20 is knocked into the mounting hole by a hand hammer. However, surface shape of an area around where the fixing pin 20 is installed is complicated. For example, both inner and outer sides of the turbine disk 10 are provided with complex special-shaped grooves (which are groove 11 and groove 12). If the tweezer is used for holding, the fixing pin 20 may easily fall off, thereby falling into the grooves on the inner and outer sides. As the fixing pin 20 is very small, and the grooves have irregular and complex special-shaped surfaces, it will be difficult to find and take out the fixing pin 20 from the grooves once the fixing pin 20 falls into the grooves on both sides.

SUMMARY

The technical problem to be solved by the present invention is to provide an installation tool for a fixing pin, which can reduce the risk of falling of the fixing pin, improve the safety of assembly, reduce the difficulty of installation, and improve the efficiency of assembly, with a simple structure, ease of operation and lower cost.

The technical solution applied by the invention to solve the above technical problem is to provide the installation tool for the fixing pin, comprising a tubular body, a pressing pin and a driving nut; the tubular body is provided with a cavity inside, which is capable of accommodating a plurality of fixing pins, a surface of the tubular body is provided with a first groove and a second groove which are opposite to each other and connected to the cavity, two ends of the tubular body are provided with a first opening and a second opening respectively which are connected to the cavity, a plurality of fixing pins are allowed to enter the cavity through the first opening and leave the cavity through the second opening; the pressing pin is provided movably on the tubular body through the first groove and the second groove, at least part of the pressing pin extruded from the surface of the tubular body; the driving nut is connected to the tubular body, and is capable of driving the pressing pin to move towards the second opening.

In an embodiment of the invention, the installation tool further comprises a pressing cover provided through the surface of the tubular body, the driving nut can drive the pressing pin to move towards the second opening by the pressing cover.

In an embodiment of the invention, a fixing groove corresponding to the pressing pin is provided on the pressing cover.

In an embodiment of the invention, the tubular body further comprises a converging portion, at least part of the cavity in the converging portion has an inner diameter smaller than the diameter of the fixing pin.

In an embodiment of the invention, the surface of the converging portion is provided with a plurality of strip shaped grooves.

In an embodiment of the invention, the converging portion is made from elastic materials.

In an embodiment of the invention, the surface of the tubular body is provided with an external thread, the driving nut is provided with an internal thread, and the driving nut is screwed with the tubular body.

In an embodiment of the invention, the diameter of the fixing pin is smaller than or equal to 2 mm, and/or the height of the fixing pin is smaller than or equal to 4 mm.

In an embodiment of the invention, the fixing pin can be used for fixing a balancing weight of a turbine rotor.

Another aspect of the invention is to provide a method for installing the installation tool for the fixing pin mentioned above, comprising the following steps: a. placing a plurality of fixing pins into a cavity of a tubular body through a first opening; b. placing a pressing pin through a first groove and a second groove; c. rotating a driving nut to drive the pressing pin to move towards a second opening, until part of the fixing pin closest to the second opening among a plurality of fixing pins leaves the cavity through the second opening; d. aligning the fixing pin closest to the second opening with a mounting hole, and continuing to rotate the driving nut until the fixing pin closest to the second opening leaves the cavity completely and enters the mounting hole; e. repeating step c to step d, until the installation of a plurality of fixing pins is completed.

Compared with the prior art, the invention has the following significant benefits due to the adoption of the above technical solutions:

The installation tool for the fixing pin according to the invention comprises the tubular body, the pressing pin and the driving nut, the tubular body is provided with the cavity inside, which is capable of accommodating a plurality of fixing pins, the two ends of the tubular body are provided with the first opening and the second opening for the entering and leaving of a plurality of fixing pins respectively. The driving nut can drive the pressing pin to move towards the second opening, thereby pushing a plurality of fixing pins, so that a plurality of fixing pin can leave the cavity of the tubular body in sequence. The installation tool for the fixing pin can reduce the risk of falling of the fixing pin, improve the safety of assembly, reduce the difficulty of installation, and improve the efficiency of assembly, with a simple structure, ease of operation and lower cost.

BRIEF DESCRIPTION OF THE DRAWINGS

In order to make the above objectives, features and advantages of the invention more obvious and easy to understand, specific embodiments of the invention are described in detail below with reference to the accompanying drawings, wherein.

DETAILED DESCRIPTION

Figure 1:
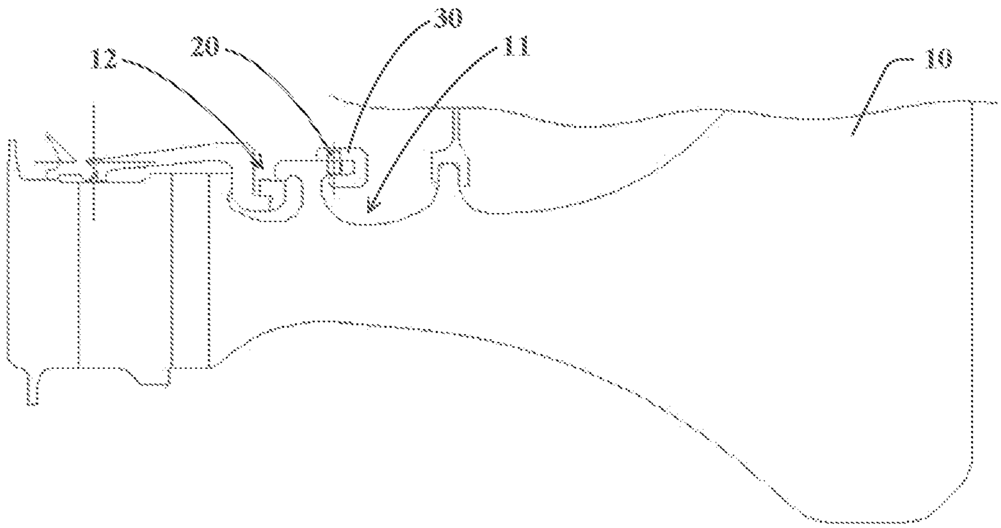
FIG. 1 is a schematic diagram of the structure of the high pressure turbine rotor.

In order to make the above objectives, features and benefits of the present invention to be understood more clearly, specific embodiments of the invention will be described in detail below with reference to the accompanying drawings.

Various specific details are described in the following description for a full understanding of the invention, but the invention can also be implemented in other ways different from those described herein, thus the invention is not limited to the specific embodiments disclosed below.

As shown in the disclosure and the claims, unless exceptions are indicated clearly in the context otherwise, the terms such as ‘a’, ‘one’, ‘a kind of, and/or ‘the’ do not specifically means to be singular, and may also be plural. Generally speaking, the terms ‘comprise’ and ‘include’ only imply comprising the steps and elements that are clearly identified, and these steps and elements do not constitute an exclusive list, the methods and devices may also comprise other steps or elements.

When describing the embodiments of the invention in detail, for the convenience of description, the cross section views showing the structure of the component will not be partially enlarged in the general scale, and the schematic diagrams are only examples, which should not limit the scope of protection of the invention. In addition, the three-dimensional spatial dimensions of length, width and depth should be included in the actual production.

For the convenience of description, the terms of spatial relationship such as ‘below’, ‘under’, ‘lower’, ‘above’, ‘over’ etc. may be used herein to describe an element shown in the figures or the relationship of a feature to other elements or features. It should be understood that these terms of spatial relationship are intended to comprise other orientations of the component in use or in operation than those indicated in the figures. For example, if the component in the figures is turned over, the orientation of the component which is described to be ‘below’, ‘under’ or ‘lower’ other elements or features should be changed to be ‘above’ other elements or features. Thus, the exemplary terms ‘below’ and ‘under’ can comprise both orientations of above and below. The component may also have other orientations (rotated 90 degrees or at other orientations), so the terms used for describing spatial relationship should be explained correspondingly. In addition, it should also be understood that when a layer is described to be ‘between’ two layers, it can be the only layer between the two layers, or there may also be one or more layers in between.

In the context of the disclosure, a structure described as a first feature ‘above’ a second feature may comprise the embodiment where the first and second features are formed in direct contact, and may also comprise the embodiment where other features are formed between the first and second features, such that the first and second features may not be in direct contact.

It should be understood that when a component is described to be ‘on another component’, ‘connected to another component’, ‘coupled to another component’ or ‘in contact with another component’, it can be on, connected to, coupled to or in contact with another component directly, or an intervening component may be present. In contrast, when a component is described to be ‘on another component directly’, ‘connected to another component directly’, ‘coupled to another component directly’ or ‘in contact with another component directly’, there is no intervening component presents.

The following embodiments of the present invention provide an installation tool for a fixing pin, which can reduce the risk of falling of the fixing pin, improve the safety of assembly, reduce the difficulty of installation, and improve the efficiency of assembly, with a simple structure, ease of operation and lower cost.

Figure 2:
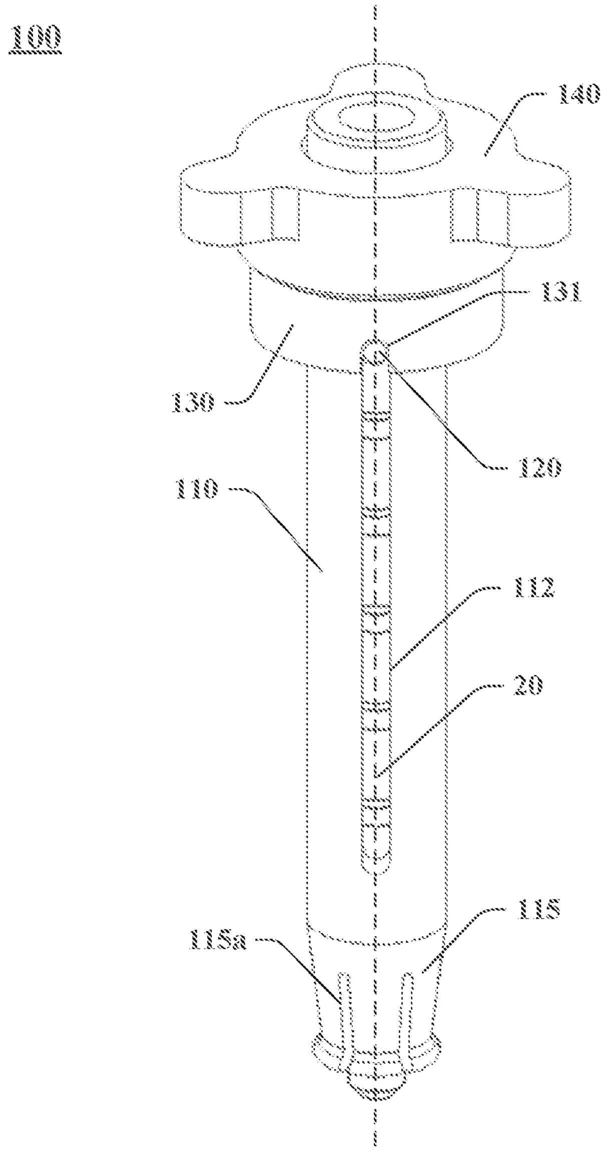
FIG. 2 is a schematic diagram of the installation tool for the fixing pin according to an embodiment of the invention.
Figure 3:
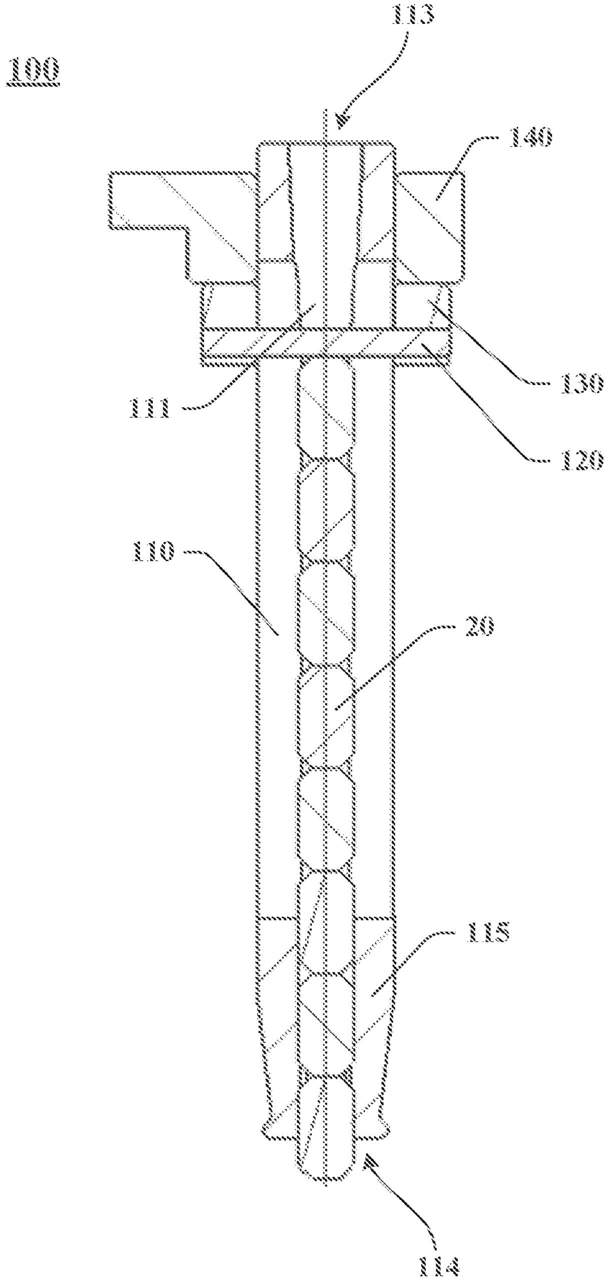
FIG. 3 is a schematic cross section diagram of the installation tool for the fixing pin according to an embodiment of the invention.

FIG. 2 is a schematic diagram of the installation tool for the fixing pin according to an embodiment of the invention. FIG. 3 is a schematic cross section diagram of the installation tool for the fixing pin according to an embodiment of the invention, wherein FIG. 3 shows the schematic cross section diagram with a dashed line shown in FIG. 2 taken as a cross section line.

The installation tool for the fixing pin will be described below with reference to FIG. 2 and FIG. 3. It is understood that the following description is only exemplary, and various changes can be made by those skilled in the art without departing from the spirit of the invention.

Referring to FIG. 2 and FIG. 3, the installation tool for the fixing pin 100 comprises a tubular body 110, a pressing pin 120 and a driving nut 140.

The tubular body 110 is provided with a cavity 111 inside, which is capable of accommodating a plurality of fixing pins 20, and a surface of the tubular body 110 is provided with a first groove 112 and a second groove (not shown in the figures) which are opposite to each other and connected to the cavity 111. Two ends of the tubular body 110 are provided with a first opening 113 and a second opening 114 respectively which are connected to the cavity 111, a plurality of fixing pins 20 are allowed to enter the cavity 111 through the first opening 113 and leave the cavity 111 through the second opening 114.

It can be understood that the inner diameter of the cavity 111 should match the diameter of the fixing pin 20. Preferably, in the following embodiments of the invention, the inner diameter of the cavity 111 is equal to the diameter of the fixing pin 20.

In some embodiments, an inner wall of the cavity 111 can be made from elastic materials, and the inner diameter of the cavity 111 can be slightly smaller than the diameter of the fixing pins 20, so as to ensure that a plurality of fixing pins 20 cannot move in the cavity 111 without an external pushing force.

The first groove 112 and the second groove can be provided on the surface of the tubular body 110 along an extending direction of the tubular body 110.

Preferably, in some embodiments shown in FIG. 2 and FIG. 3, the tubular body 110 is in the shape of a cylinder. A centerline of the first groove 112, a centerline of the second groove and a centerline of the tubular body 110 are in the same plane, but the invention is not limited to the embodiments.

The pressing pin 120 is provided movably on the tubular body 110 through the first groove 112 and the second groove, and at least part of the pressing pin 120 is extruded from the surface of the tubular body 110. The first groove

112 and the second groove play a guiding role during the motion of the pressing pin 120.

In some embodiments, only one end of the pressing pin 120 is extruded from the surface of the tubular body 110. In other embodiments, both ends of the pressing pin 120 are extruded from the surface of the tubular body 110, and those skilled in the art can make corresponding modifications according to actual needs, and the invention is not limited to the embodiments.

The driving nut 140 is connected to the tubular body 110, and is capable of driving the pressing pin 120 to move towards the second opening 114.

Exemplarily, the pressing pin 120 can be placed through the first groove 112 and the second groove, and moved to an end surface close to the first opening 113 of the fixing pin which is the one being closest to the first opening 113 among a plurality of fixing pins 20, such that when the pressing pin 120 is driven by the driving nut 140 to move towards the second opening 114, a plurality of fixing pins 20 in the cavity 111 will be pushed to move towards the second opening 114.

In an embodiment of the invention, the surface of the tubular body 110 is provided with an external thread (not shown in the figures), the driving nut 140 is provided with an internal thread (not shown in the figures), and the driving nut 140 is screwed with the tubular body 110, such that when the driving nut 140 rotates, the driving nut 140 will move on the surface of the tubular body 110 by means of a pair of threads, thereby driving the pressing pin 120 to move towards the second opening 114.

Preferably, the external thread provided on the surface of the tubular body 110 allows the driving nut 140 move towards the second opening 114 on the surface of the tubular body 110 to a limiting position, and all of the fixing pins 20 in the cavity 111 will be pushed out of the cavity 111 by the pressing pin 120.

In an embodiment of the invention, the installation tool 100 further comprises a pressing cover 130 provided between the pressing pin 120 and the driving nut 140, and the pressing cover 130 is provided through the surface of the tubular body 110, so the driving nut 140 can drive the pressing pin 120 to move towards the second opening 114 by the pressing cover 130.

In the embodiment shown in FIG. 2, a fixing groove 131 corresponding to the pressing pin 120 is provided on one side of the pressing cover 130 where the pressing pin 120 locates. The pressing pin 120 can be fixed into the fixing groove 131 of the pressing cover 130 when moving towards the second opening 114.

Referring to FIG. 3, in a preferred embodiment of the invention, both ends of the pressing pin 120 are extruded from the surface of the tubular body 110, and the diameter of the pressing pin 120 matches (such as equal) the diameter of the pressing cover 130, such that when the driving nut 140 drives the pressing pin 120 to move towards the second opening 114 by the pressing cover 130, the two ends of the pressing pin 120 can maintain a good balance.

In an embodiment of the invention, the diameter of the fixing pin 20 can be smaller than or equal to 2 mm. In some embodiments, the height of the fixing pin can be smaller than or equal to 4 mm.

Referring to FIG. 1, in an embodiment of the invention, the fixing pin 20 can be used for fixing a balancing weight 30 of the turbine rotor.

Figure 4:
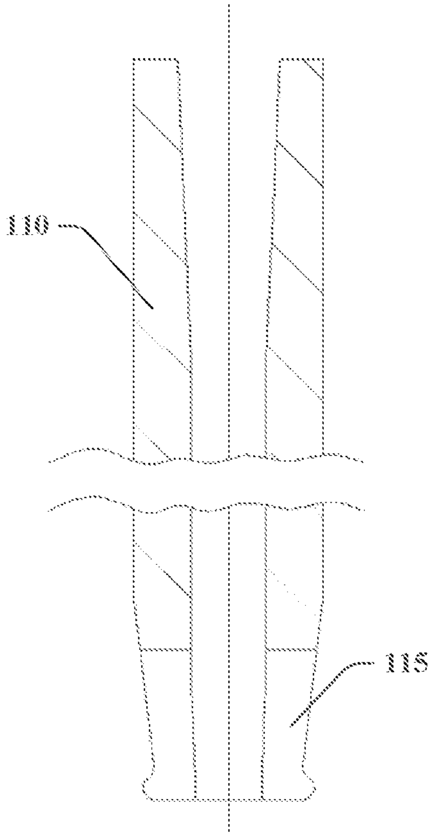
FIG. 4 is a schematic cross section diagram of the converging portion of the installation tool for the fixing pin according to an embodiment of the invention.

FIG. 4 is a schematic cross section diagram of the converging portion of the installation tool for the fixing pin. Referring to FIG. 2 to FIG. 4, in an embodiment of the invention, the tubular body 110 further comprises a converging portion 115, wherein at least part of the cavity 111 in the converging portion 115 has an inner diameter smaller than the diameter of the fixing pin 20.

Exemplarily, it can be that at least part of the cavity 111 in the converging portion 115 has the inner diameter smaller than the diameter of the fixing pin 20; or it can also be that all of the cavity 111 in the converging portion 115 has the inner diameter smaller than the diameter of the fixing pin 20.

With at least part of the cavity 111 in the converging portion 115 having the inner diameter smaller than the diameter of the fixing pin 20, it can be ensured that a plurality of fixing pins 20 are not able to leave the cavity 111 through the second opening 114 without the external pushing force.

Continuing to refer to FIG. 2, in an embodiment of the invention, the surface of the converging portion 115 can be provided with a plurality of strip shaped grooves **115*a*, which can separate the converging portion 115 into a plurality of flap-like structure, so that the converging portion 115** has a certain degree of elasticity.

In some embodiments, the converging portion 115 can be made from elastic materials.

Such that when a plurality of fixing pin 20 in the cavity 111 move towards the second opening 114 due to the external pushing force (such as being pushed by the pressing pin 120), the inner diameter of at least part of the cavity 111 in the converging portion 115 will increase correspondingly due to the pressing force exerted thereon, so that a plurality of fixing pin 20 can leave the cavity 111 in sequence through the second opening 114.

In the above embodiment of the invention, the converging portion 115 is part of the tubular body 110. In some other embodiments of the invention, the converging portion 115 can also be an individual component. The converging portion 115 can be connected fixedly to the tubular body 110 by a plurality of connection methods comprising screw connection, and the invention is not limited to the embodiments.

Those skilled in the art can make corresponding modifications on the specific size (such as the length) of the converging portion 115 according to actual needs, and the invention is not limited to the embodiments.

The installation tool for the fixing pin 100 according to the invention can prevent the fixing pins 20 from falling into the special-shaped grooves (such as groove 11 and groove 12) on inner and outer sides of a turbine disk 10 effectively during the installation process by placing a plurality of fixing pins 20 into the cavity 111 of the tubular body 110, thereby improving the safety of assembly.

In addition, provided with a suitable capacity of the cavity 111, the installation tool 100 can accommodate a plurality of fixing pins 20 at the same time, which reduces the time taken for taking the fixing pins 20 separately, shortens the period of installation, and improves the efficiency of assembly.

On the other hand, the invention reduces the difficulty of installation by enlarging the mini size fixing pin 20 to the installation tool for the fixing pin 100 that can be operated by hand. The installation tool for the fixing pin 100 has a simple structure, is easy to operate and has a low cost.

The above embodiments of the invention provide the installation tool for the fixing pin, which can reduce the risk of falling of the fixing pin, improve the safety of assembly, reduce the difficulty of installation, and improve the efficiency of assembly, with a simple structure, ease of operation and lower cost.

Another aspect of the present invention is to provide a method for installing a fixing pin, which can reduce the risk of falling of the fixing pin, improve the safety of assembly, reduce the difficulty of installation, and improve the efficiency of assembly, with a simple structure, ease of operation and lower cost.

The method for installing the fixing pin comprises the following steps: a. placing a plurality of fixing pins into a cavity of a tubular body through a first opening; b. placing a pressing pin through a first groove and a second groove; c. rotating a driving nut to drive the pressing pin to move towards a second opening, until part of the fixing pin closest to the second opening among a plurality of fixing pins leaves the cavity through the second opening; d. aligning the fixing pin closest to the second opening with a mounting hole, and continuing to rotate the driving nut until the fixing pin closest to the second opening leaves the cavity completely and enters the mounting hole; e. repeating step c to step d, until the installation of a plurality of fixing pins is completed.

Figure 5:
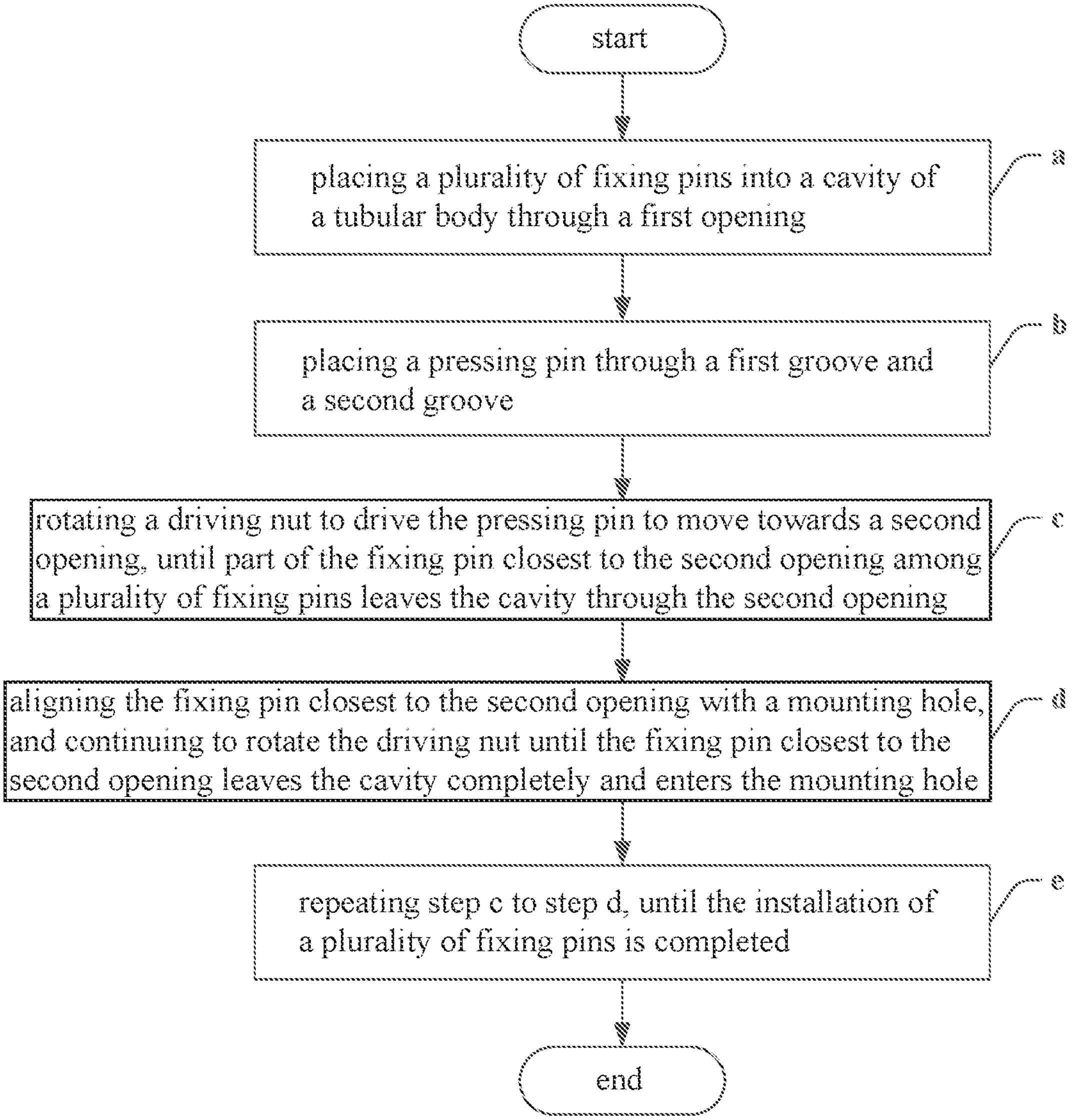
FIG. 5 is a flowchart of the method for installing the fixing pin according to an embodiment of the invention.
Figure 6:
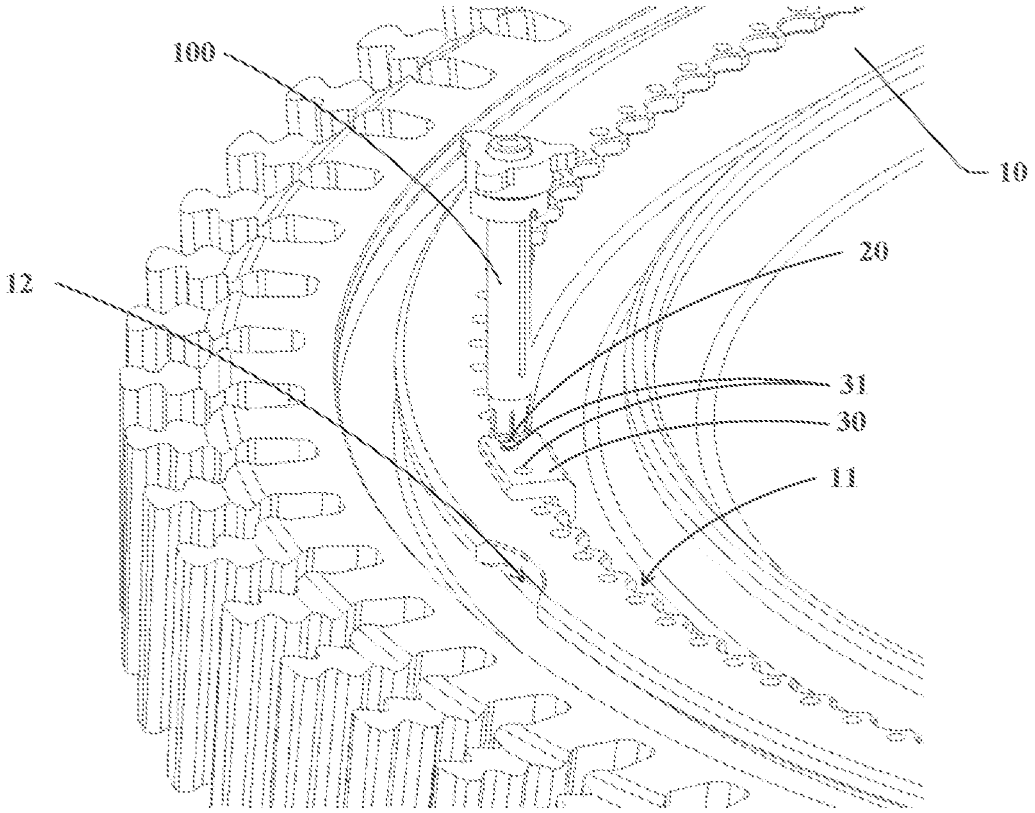
FIG. 6 is a schematic diagram of the method for installing the fixing pin according to an embodiment of the invention.

FIG. 5 is a flowchart of the method for installing the fixing pin according to an embodiment of the invention. FIG. 6 is a schematic diagram of the method for installing the fixing pin according to an embodiment of the invention.

The method for installing the fixing pin will be described below with reference to FIG. 5 and FIG. 6. It can be understood that the following descriptions are only exemplary, and various changes can be made by those skilled in the art without departing from the spirit of the present invention.

It should be noted that the installation method can be implemented by, for example, the installation tool for the fixing pin 100 shown in FIG. 2 to FIG. 4 or a modified embodiment thereof, but the invention is not limited to the embodiments.

Referring to FIG. 5, the installation method comprises the following steps:

Step a, placing a plurality of fixing pins 20 into the cavity 111 of the tubular body 110 through the first opening 113.

Exemplarily, a plurality of fixing pins 20 can be placed into the cavity 111 of the tubular body 110 through the first opening 113 in an end-to-end manner.

Referring to FIG. 2, in an embodiment of the invention, the installation tool 100 further comprises a pressing cover 130 provided between the pressing pin 120 and the driving nut 140, and the pressing cover 130 is provided through the surface of the tubular body 110, so the driving nut 140 can drive the pressing pin 120 to move towards the second opening 114 by the pressing cover 130.

In an embodiment of the invention, the diameter of the fixing pin 20 can be smaller than or equal to 2 mm. In some embodiments, the height of the fixing pin can be smaller than or equal to 4 mm.

Referring to FIG. 1, in an embodiment of the invention, the fixing pin 20 can be used for fixing a balancing weight 30 of the turbine rotor.

Alternatively, the installation method may further comprise a step of removing the pressing pin 120 from the tubular body 110 before step a.

Alternatively, the installation method may further comprise a step of removing the pressing pin 120, the pressing cover 130 and the driving nut 140 from the tubular body 110 respectively before step a, but the invention is not limited to the embodiments.

Step b, placing the pressing pin 120 through the first groove 112 and the second groove (not shown in the figures).

The pressing pin 120 can be placed through the first groove 112 and the second groove, and moved to an end surface close to the first opening 113 of the fixing pin which is the one being closest to the first opening 113 among a plurality of fixing pins 20. At least part of the pressing pin 120 is extruded from the surface of the tubular body 110. The first groove 112 and the second groove can play a guiding role during the motion of the pressing pin 120.

In some embodiments, only one end of the pressing pin 120 is extruded from the surface of the tubular body 110. In other embodiments, both ends of the pressing pin 120 are extruded from the surface of the tubular body 110, and those skilled in the art can make corresponding modifications according to actual needs, and the invention is not limited to the embodiments.

Referring to FIG. 3, in a preferred embodiment of the invention, both ends of the pressing pin 120 are extruded from the surface of the tubular body 110, and the diameter of the pressing pin 120 matches (such as equal) the diameter of the pressing cover 130, such that when the driving nut 140 drives the pressing pin 120 to move towards the second opening 114 by the pressing cover 130, the two ends of the pressing pin 120 can maintain a good balance.

Alternatively, the installation method may further comprise a step of mounting the pressing cover 130 and the driving nut 140 onto the tubular body 110 respectively after step b.

In the embodiment shown in FIG. 2, a fixing groove 131 corresponding to the pressing pin 120 is provided on one side of the pressing cover 130 where the pressing pin 120 locates. The pressing pin 120 can be fixed into the fixing groove 131 of the pressing cover 130 when moving towards the second opening 114.

Step c, rotating the driving nut 140 to drive the pressing pin 120 to move towards the second opening 114, until part of the fixing pin closest to the second opening 114 among a plurality of fixing pins 20 leaves the cavity 111 through the second opening 114.

In an embodiment of the invention, the surface of the tubular body 110 is provided with an external thread (not shown in the figures), the driving nut 140 is provided with an internal thread (not shown in the figures), and the driving nut 140 is screwed with the tubular body 110, such that when the driving nut 140 rotates, the driving nut 140 will move on the surface of the tubular body 110 by means of a pair of threads, thereby driving the pressing pin 120 to move towards the second opening 114.

Referring to FIG. 2 to FIG. 4, in an embodiment of the invention, the tubular body 110 further comprises a converging portion 115, wherein at least part of the cavity 111 in the converging portion 115 has an inner diameter smaller than the diameter of the fixing pin 20.

Exemplarily, it can be that at least part of the cavity 111 in the converging portion 115 has the inner diameter smaller than the diameter of the fixing pin 20; or it can also be that all of the cavity 111 in the converging portion 115 has the inner diameter smaller than the diameter of the fixing pin 20.

With at least part of the cavity 111 in the converging portion 115 having the inner diameter smaller than the diameter of the fixing pin 20, it can be ensured that a plurality of fixing pins 20 are not able to leave the cavity 111 through the second opening 114 without an external pushing force.

Continuing to refer to FIG. 2, in an embodiment of the invention, the surface of the converging portion 115 can be provided with a plurality of strip shaped grooves **115*a*, which can separate the converging portion 115 into a plurality of flap-like structure, so that the converging portion 115** has a certain degree of elasticity.

In some embodiments, the converging portion 115 can be made from elastic materials.

Such that when a plurality of fixing pin 20 in the cavity 111 move towards the second opening 114 due to the external pushing force (such as being pushed by the pressing pin 120), the inner diameter of at least part of the cavity 111 in the converging portion 115 will increase correspondingly due to the pressing force exerted thereon, so that a plurality of fixing pin 20 can leave the cavity 111 in sequence through the second opening 114.

In the above embodiment of the invention, the converging portion 115 is part of the tubular body 110. In some other embodiments of the invention, the converging portion 115 can also be an individual component. The converging portion 115 can be connected fixedly to the tubular body 110 by a plurality of connection methods comprising screw connection, and the invention is not limited to the embodiments.

Those skilled in the art can make corresponding modifications on the specific size (such as the length) of the converging portion 115 according to actual needs, and the invention is not limited to the embodiments.

Preferably, in this step, the portion of the fixing pin closest to the second opening 114 leaving the cavity 111 can have a height smaller than or equal to half of the height of a single fixing pin 20, but the invention is not limited to the embodiment.

Step d, aligning the fixing pin closest to the second opening 114 with the mounting hole 31, and continuing to rotate the driving nut 140 until the fixing pin closest to the second opening 114 leaves the cavity 111 completely and enters the mounting hole 31.

Referring to FIG. 6, the installation tool 100 can be moved to the position above the balancing weight 30 of the turbine rotor to be fixed, and the fixing pin closest to the second opening 114 is aligned with the corresponding mounting hole 31. Then continue to rotate the driving nut 140 until the fixing pin closest to the second opening 114 leaves the cavity 111 completely and enters the mounting hole 31.

Step e, repeating step c to step d, until the installation of a plurality of fixing pins 20 is completed.

After the above steps, all of the fixing pins 20 in the cavity 111 can be mounted into the corresponding mounting holes 31 respectively.

The method for installing the fixing pin according to the invention can prevent the fixing pins 20 from falling into the special-shaped grooves (such as groove 11 and groove 12) on inner and outer sides of a turbine disk 10 effectively during the installation process by inserting a plurality of fixing pins 20 into the cavity 111 of the tubular body 110, thereby improving the safety of assembly.

In addition, provided with a suitable capacity of the cavity 111, the installation tool 100 can accommodate a plurality of fixing pins 20 at the same time, which reduces the time taken for taking the fixing pins 20 separately, shortens the period of installation, and improves the efficiency of assembly.

On the other hand, the invention reduces the difficulty of installation by enlarging the mini size fixing pin 20 to the installation tool for the fixing pin 100 that can be operated by hand. The installation tool for the fixing pin 100 has a simple structure, is easy to operate and has a low cost.

It should be noted that the flowchart shown in FIG. 5 is used herein to illustrate the steps/operations performed by the installation method according to the embodiments of the invention. It can be understood that the steps/operations does not need to be performed in the exact order. The steps/operations can rather be performed reversely or concurrently. Meanwhile, other steps/operations can be added into these processes, or some step/operation or steps/operations can be removed from these processes.

Other details of implementation of the installation method of the embodiment can refer to the embodiment described by FIG. 2 to FIG. 4, and will not be described herein. Those skilled in the art can make appropriate modifications to the order of priority of the specific operation steps of the installation method according to actual needs, and the invention is not limited to the embodiments.

The above embodiments of the present invention provide the method for installing the fixing pin, which can reduce the risk of falling of the fixing pin, improve the safety of assembly, reduce the difficulty of installation, and improve the efficiency of assembly, with a simple structure, ease of operation and lower cost.

It can be understood that although some implementations of the invention that are considered to be useful currently are discussed by various embodiments in the foregoing disclosure, such details are only for illustration, and the appended claims are not limited to the embodiment disclosed, in contrast, the claims are intended to cover any combination of the modifications and equivalents that consistent with the spirit and scope of the embodiments of the invention.

The basic concepts have been described above, obviously, for those skilled in the art, the above disclosure of the invention is only an example, and does not constitute a limitation to the disclosure. Although not described explicitly herein, various modifications, improvements and modifications can be made by those skilled in the art. The modifications, improvements and modifications are suggested in the disclosure, so such modifications, improvements and modifications still fall within the spirit and scope of the exemplary embodiments of the disclosure.

Meanwhile, specific terms are used in the disclosure to describe the embodiments of the invention. Such as 'an embodiment', 'one embodiment' and/or 'some embodiments' refer to a certain feature, structure or characteristic relative to at least one embodiment of the invention. Therefore, it should be noted and emphasized that 'an embodiment' or 'one embodiment' mentioned two or more times at different positions of the description do not necessarily refer to the same embodiment. In addition, some features, structures or characteristics according to one or more embodiments of the invention can be combined as appropriate.

Furthermore, unless stated explicitly in the claims, the order of processing elements and sequences, the use of numbers and letters, or the use of other names described herein are not intended to limit the order of the procedures and methods of the disclosure. Although some implementations of the invention that are considered to be useful currently are discussed by various embodiments in the foregoing disclosure, it should be understood that such details are only for illustration, and the appended claims are not limited to the embodiment disclosed, in contrast, the claims are intended to cover any combination of the modifications and equivalents that consistent with the spirit and scope of the embodiments of the invention. For example, although the system components described above may be implemented by hardware devices, they may also be implemented only by software solutions, such as installing the described systems on the servers or mobile devices in the prior art.

Similarly, it should be noted that, in order to simplify the expression of the disclosure, thereby improving the understanding of one or more embodiments of the invention, in the foregoing description of the embodiments of the invention, various features will sometimes be combined into one embodiment, figure or the descriptions thereof. However, this method of disclosure does not imply that more features than those mentioned in the claims are required for the subject matter of the invention. Indeed, the features of the embodiment are fewer than all of the features of a single embodiment disclosed above.

In some embodiments, numbers are used for describing the quantity of ingredients and properties, it should be understood that such numbers are suitable for the description of the embodiments, and in some embodiments, the terms 'about', 'approximately' or 'substantially' are used for modifying. Unless stated otherwise, the terms 'about', 'approximately' or 'substantially' means that a variation of ±20% is allowed for the stated number. Correspondingly, in some embodiments, the numerical parameters used in the description and claims are approximations that may vary depending on the desired characteristics of the individual embodiment. In some embodiments, the specified significant figure and using a general figure reservation method should be taken into account for the numerical parameters. Although the numerical range and parameter for confirming the breadth of the range in some embodiments of the invention are approximations, in a specific embodiment such numerical values should be provided as precise as possible within the allowable range.

Although the invention has been described with reference to the present specific embodiments, those of ordinary skill in the art should recognize that the above embodiments are only used for illustration the invention, and various equivalent modifications or substitutions can be made without departing from the spirit of the invention, therefore the modifications and changes to the embodiments mentioned above within the spirit and scope of the invention should fall within the scope of the claims of the disclosure.

The invention claimed is:

1. An installation tool for a fixing pin, wherein the installation tool comprises a tubular body, a pressing pin and a driving nut;

the tubular body is provided with a cavity inside, which is capable of accommodating a plurality of fixing pins, a surface of the tubular body is provided with a first groove and a second groove which are opposite to each other and connected to the cavity, two ends of the tubular body are provided with a first opening and a second opening respectively which are connected to the cavity, wherein a plurality of fixing pins are allowed to enter the cavity through the first opening, and wherein each of the plurality of fixing pins is configured to leave the cavity through the second opening one at a time in sequence;

the pressing pin is provided movably on the tubular body through the first groove and the second groove, and both ends of the pressing pin are extruded from the surface of the tubular body;

the driving nut is configured to rotate around a central axis aligned with the cavity, is connected to the tubular body at a first end of the tubular body, and is capable of driving the pressing pin to move towards the second opening;

wherein the installation tool also comprises a pressing cover provided through the surface of the tubular body, the pressing cover located immediately distal of the driving nut and immediately proximal of the pressing pin, wherein the driving nut can drive the pressing pin to move towards the second opening by the pressing cover, and a fixing groove corresponding to the pressing pin is provided on the pressing cover; and the tubular body also comprises a converging portion at a second end, the converging portion comprising a tapered structure having a first diameter adjacent the second end of the tubular body that is identical to a diameter of the tubular body and having a second diameter opposite the second end of the tubular body that is smaller than the diameter of the tubular body, at least part of the cavity in the converging portion has an inner diameter smaller than a diameter of the fixing pin, and the fixing pin can be used for fixing a balancing weight of a turbine rotor.

2. The installation tool of claim 1, wherein the surface of the converging portion is provided with a plurality of strip shaped grooves.

3. The installation tool of claim 1, wherein the converging portion is made from elastic materials.

4. The installation tool of claim 1, wherein the surface of the tubular body is provided with an external thread, the driving nut is provided with an internal thread, and the driving nut is screwed with the tubular body.

5. The installation tool of claim 1, wherein the diameter of the fixing pin is smaller than or equal to 2 mm, and/or the a height of the fixing pin is smaller than or equal to 4 mm.

6. A method for installing the installation tool for the fixing pin of claim 1, comprising the following steps:

a. placing a plurality of fixing pins into the cavity of the tubular body through the first opening;
b. placing the pressing pin through the first groove and the second groove;
c. rotating the driving nut to drive the pressing pin to move towards the second opening, until part of the fixing pins closest to the second opening among a plurality of fixing pins leaves the cavity through the second opening;
d. aligning the fixing pin closest to the second opening with a mounting hole, and continuing to rotate the driving nut until the fixing pin closest to the second opening leaves the cavity completely and enters the mounting hole; and
e. repeating step c to step d, until the installation of a plurality of fixing pins is completed.

* * * * *